(12) United States Patent
del Castillo et al.

(10) Patent No.: US 10,301,017 B2
(45) Date of Patent: May 28, 2019

(54) FLYING AND WALKING DRONE

(71) Applicants: Patrick del Castillo, Olathe, KS (US); Jason Curtis Miller, Kansis City, KS (US)

(72) Inventors: Patrick del Castillo, Olathe, KS (US); Jason Curtis Miller, Kansis City, KS (US)

(*) Notice: Subject to any disclaimer, the term of this patent is extended or adjusted under 35 U.S.C. 154(b) by 0 days.

(21) Appl. No.: 15/687,911

(22) Filed: Aug. 28, 2017

(65) Prior Publication Data
US 2018/0127091 A1    May 10, 2018

Related U.S. Application Data

(60) Provisional application No. 62/379,782, filed on Aug. 26, 2016.

(51) Int. Cl.
| | |
|---|---|
| *B64C 25/50* | (2006.01) |
| *B64C 37/00* | (2006.01) |
| *B60F 5/02* | (2006.01) |
| *B64C 39/02* | (2006.01) |
| *B64C 11/28* | (2006.01) |
| *B62D 57/032* | (2006.01) |
| *B64D 1/22* | (2006.01) |
| *B64C 25/10* | (2006.01) |

(Continued)

(52) U.S. Cl.
CPC ............... *B64C 37/00* (2013.01); *B60F 5/02* (2013.01); *B62D 57/032* (2013.01); *B64C 11/28* (2013.01); *B64C 25/10* (2013.01); *B64C 27/08* (2013.01); *B64C 39/024* (2013.01); *B64D 1/02* (2013.01); *B64D 1/22* (2013.01); *B64C 2201/024* (2013.01); *B64C 2201/042* (2013.01); *B64C 2201/088* (2013.01); *B64C 2201/108* (2013.01); *B64C 2201/126* (2013.01); *B64C 2201/128* (2013.01); *B64C 2201/146* (2013.01); *B64C 2201/165* (2013.01)

(58) Field of Classification Search
CPC ..... B64C 37/00; B64C 39/024; B64C 39/028; B64C 2201/024; B64C 2201/027; B64C 2201/088; B64C 2201/042; B64C 2201/126; B64C 2201/165; B60F 5/02; B62D 57/00; B62D 57/02; B62D 57/032
See application file for complete search history.

(56) References Cited

U.S. PATENT DOCUMENTS

| | | | | |
|---|---|---|---|---|
| 2002/0060267 | A1* | 5/2002 | Yavnai | G05D 1/0038 244/23 A |
| 2013/0269585 | A1* | 10/2013 | Kim | B63G 8/001 114/331 |
| 2017/0305537 | A1* | 10/2017 | Smith | B64C 27/02 |

* cited by examiner

*Primary Examiner* — Richard G Davis
(74) *Attorney, Agent, or Firm* — Indiano & McConnell, LLC; E. Victor Indiano; John T. Woods

(57) ABSTRACT

The present application discloses an apparatus capable of walking and flight. This apparatus includes a central section supported by a plurality of limbs, wherein a distal end of each of the plurality of limbs defines a contact surface. These limbs are configured to generate a walking-type motion in which the contact surfaces of the limbs cooperate with an environmental surface in a manner sufficient to propel the central section relative the environmental surface. The apparatus further includes a motor operably coupled to at least one limb of the plurality of limbs, wherein the motor is drivingly coupled to a propeller, and wherein the motor and propeller are configured to propel the central section in flight.

16 Claims, 7 Drawing Sheets

(51) Int. Cl.
*B64C 27/08* (2006.01)
*B64D 1/02* (2006.01)

FLYING AND WALKING DRONE

RELATED APPLICATION DATA

This application claims priority to U.S. Provisional Application No. 62/379,782 filed Aug. 26, 2016, the entire contents of which are incorporated herein by reference.

TECHNICAL FIELD

The present invention generally relates to robotics and more particularly, but not exclusively, to a drone which can fly and walk.

BACKGROUND

A variety of walking robots are known in the prior art. One such robot is the PhantomX AX Metal Hexapod Mark III hexapod robot, depicted in FIG. 1, manufactured by Trossen Robotics. http://www.trossenrobotics.com/. A video of the robot's capabilities may be viewed on the Internet at https://www.youtube.com/watch?v=rAeQn5QnyXo, the video incorporated herein by reference. This hexapod 100 includes a plurality of legs 102 which cooperate to move the hexapod 100 via a walking motion. FIG. 2 depicts an illustrative leg construction of these prior art walking robots. Although the gait of many walking robots is stable, even in slightly uneven terrain, there are still limitations to the terrain this robot can traverse (e.g. barriers such as a fence, large rocks, or the like). Moreover, walking robots are somewhat limited to a relatively low speed.

Flying drones, on the other hand, are able to fly over most obstacles which are present on the ground. They are also often able to achieve a greater speed of motion than of walking robots. One type of flying drone is a mutlicopter. An exemplary multicopter of the prior art is the DJI Spreading Wings S900 Hexacopter. A discussion of the S900 can be viewed on the Internet at https://www.engadget.com/2014/08/04/djis-s900/. These multicopters include a number of fixed propellers which rotate about a vertical axis. This configuration results in inefficient forward flight. Moreover, many multicopters of the prior art deplete their batteries in a short amount of time and have limited surfaces on which they can land. Therefore, there remains a need for further contributions in this area of technology.

SUMMARY

One embodiment of the present application includes a flying and walking drone. A plurality of legs are configured to generate a walking motion. At least two of the legs include propeller assemblies attached thereto, which are configured to lift the drone in flight. Other embodiments include unique flying and walking drone apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
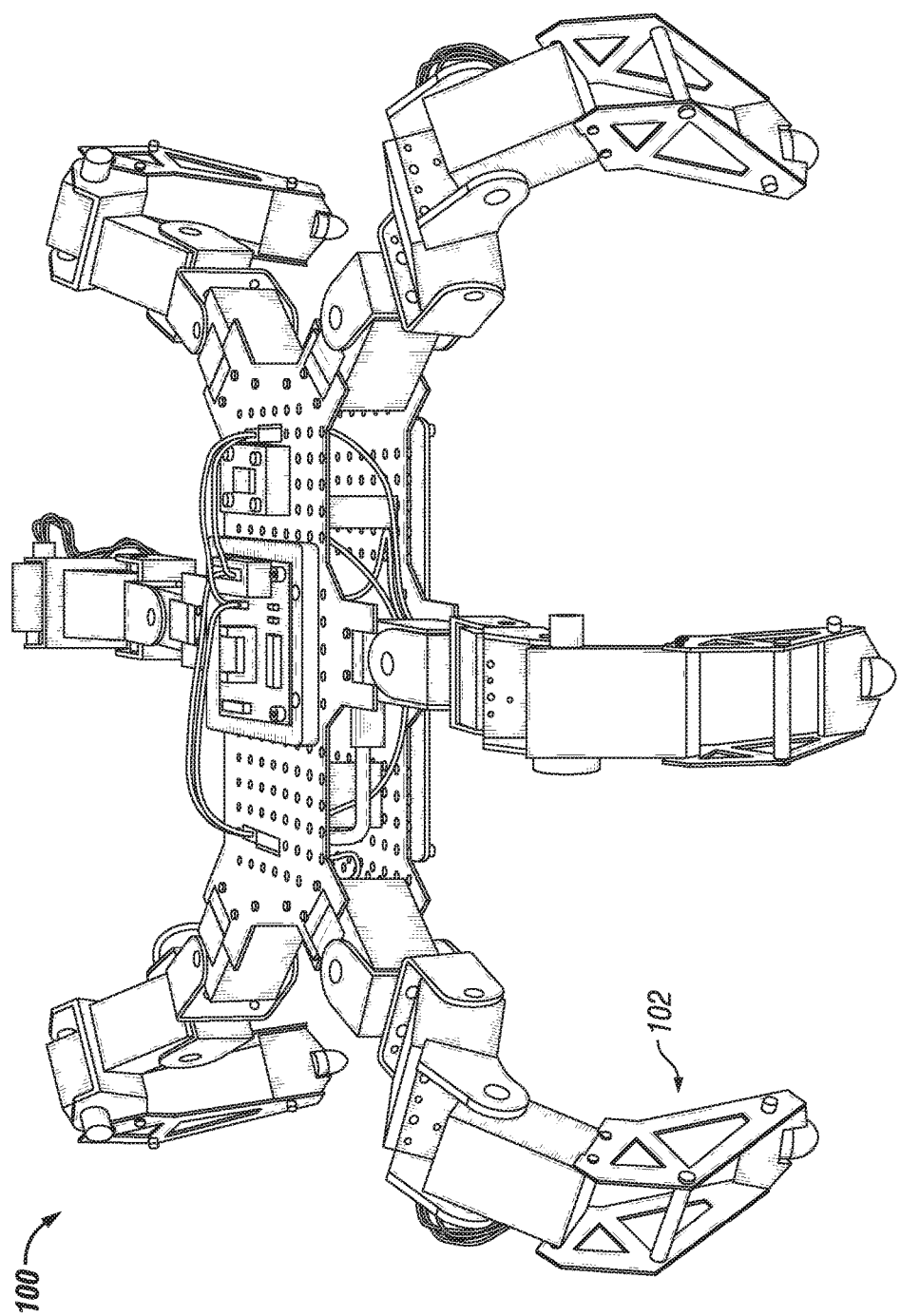
FIG. 1 depicts a walking robot embodying the teachings of the prior art.
Figure 2:
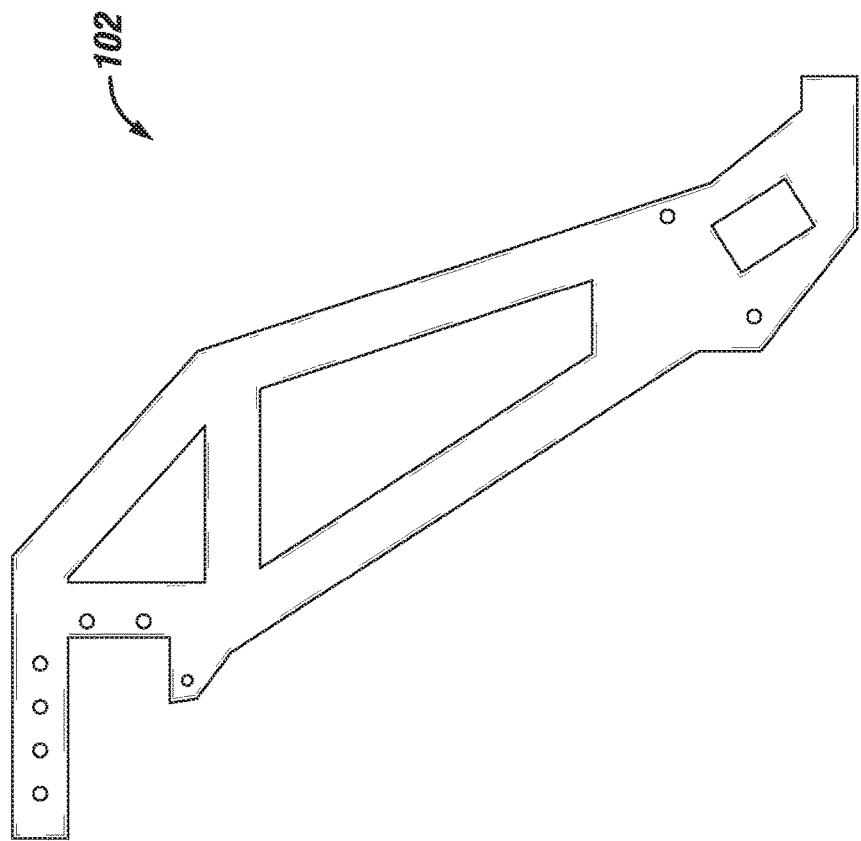
FIG. 2 depicts a plan view of a leg of a walking robot embodying the teachings of the prior art.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

As utilized herein, the term drone encompasses any unmanned vehicles which may be remotely controlled and/or autonomous. The present application is directed to a drone which can both fly and walk.

Figure 3:
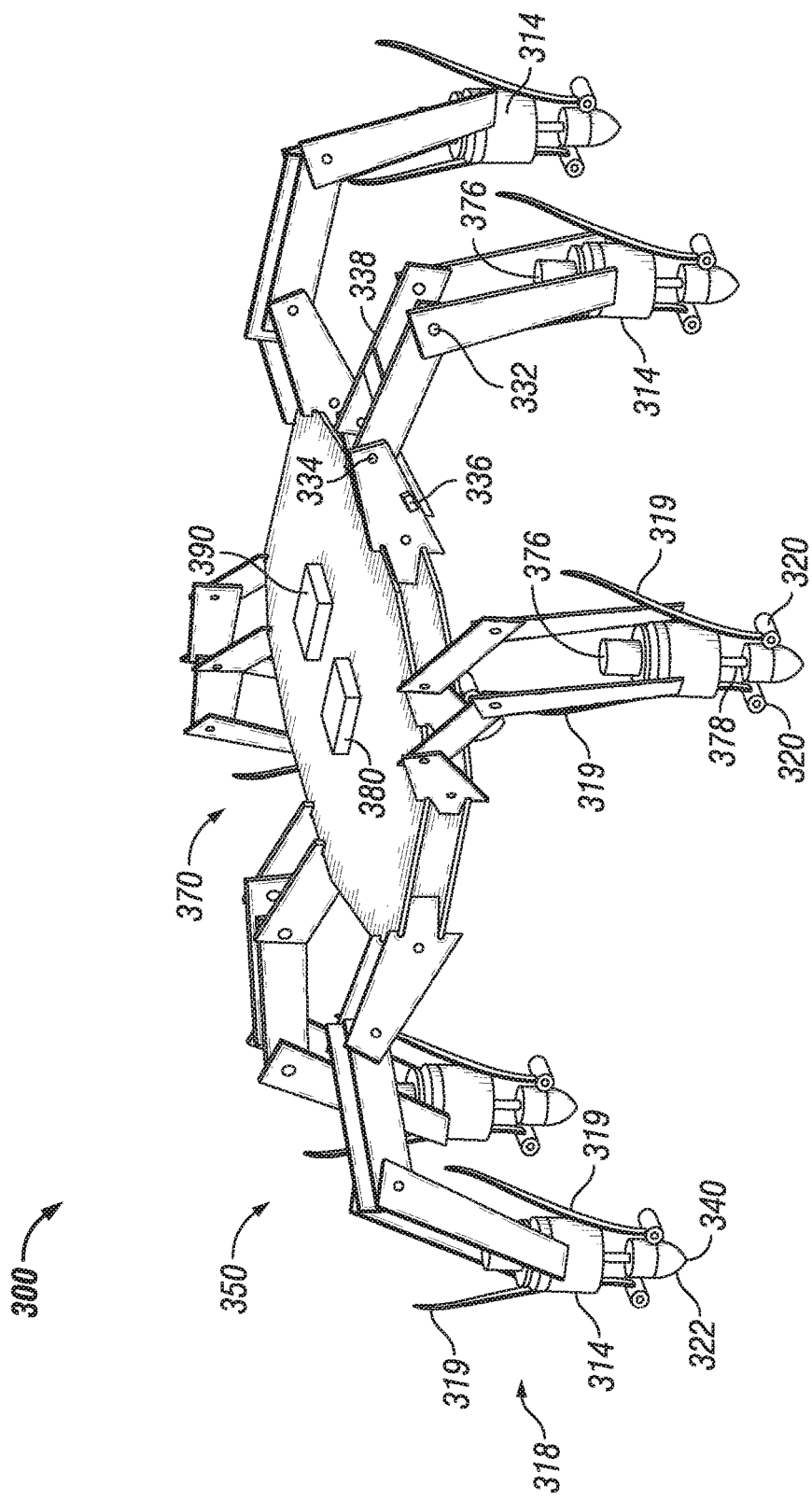
FIG. 3 is a perspective view of a walking and flying drone, depicted in a walking configuration, constructed in accordance with several features of the present application.

FIG. 3 depicts a flying and walking drone 300 according to one form of the present application. In this form, the drone 300 includes a propeller 318 located near a distal end of a limb 350. The drone 300 includes a central section 370 which houses a variety of electronic components which facilitate the operation of the drone 300. For example, the central section 370 is depicted as housing a battery pack 380 and an antenna 390 capable of receiving signals from a remote control device (not shown). This central section 370 can additionally house various processors and controllers as would be readily understood to one of ordinary skill in the art. For example, the central section 370 can house a flight controller to make the drone 300 fully autonomous—e.g. the drone 300 can fly, walk, and transition between a walking configuration and a flying configuration without human intervention. The central section 370 acts as an attachment point for limbs 350.

The limbs 350 are depicted as a plurality of legs 350. These legs 350 generate a walking-type motion. This walking motion is facilitated via a motor and a joint. As illustrated, the legs 350 include a first joint 332 and a second joint 334. The walking motors 338 and 336 act on the legs 350 in a manner such that the legs 350 pivot at the joints 332 and 334. A contact surface 340, near a distal end of each leg 350, is selectively depressed against an environmental surface, such as the ground, a sidewalk, an interior floor, or the like, to achieve this walking motion.

The legs 350 can have any number of joints/motors such that the limbs 350 can generate a walking-type motion to propel the central section 370. In a further non-limiting form, the legs 350 can include three joints: a hip-type joint located near where the leg 350 attaches to the central section 370, an ankle-type joint located near a distal end of the leg 350, and a knee-type joint located in the leg 350 between the hip-type joint and the ankle-type joint. In one form, each of the joints can rotate approximately 300 degrees; however, it is contemplated that any freedom of rotation could be utilized such that the legs can cooperate to create a walking motion.

The legs 350 having a flying motor 314 attached thereto. This motor 314 is drivingly coupled to a propeller 318 in a manner sufficient to achieve flight. The motor 314 can be a direct drive or a geared electric motor. As will be discussed with regard to FIGS. 4 and 5, the motor 314 can be an inrunner or an outrunner. In FIG. 3, the motors 314 are depicted as direct drive brushless DC motors of the inrunner variety. However, it is contemplated that motors 314 can take on any form suitable to power propeller 318 in a manner sufficient to achieve flight.

The propeller 318 includes one or more blades 319, extending outwardly from a central hub 322, which are configured to generate thrust when rotated by the motor 314. In FIG. 3, the central hub 322 of the propeller 318 is the contact surface 340. This contact surface 340 is in essence the foot of the leg 350 that interacts with the environmental surface. The contact surface 340 of FIG. 3 is depicted as a spinner; however, a variety of forms, including, but not limited to cylinders or semi-spheres are contemplated for the contact surface 340. The contact surface 340 can comprise a variety of shapes and softness, depending upon the terrain the drone 300 is to traverse.

Figure 6:
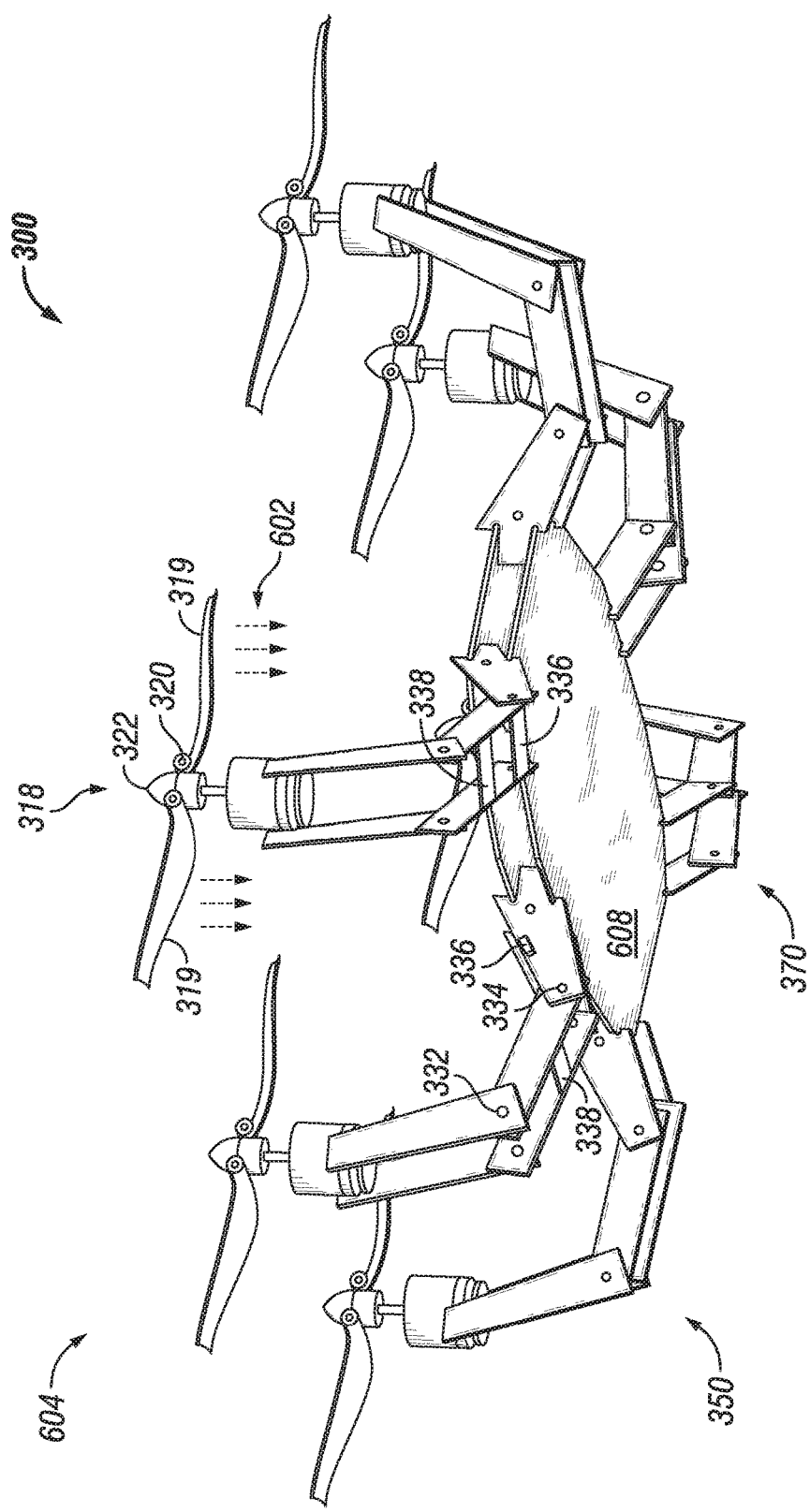
FIG. 6 depicts the walking and flying drone of FIG. 3 in a flying configuration.

In some forms, propeller blades 319 can be folded when not in use (e.g. when in a walking configuration). The propeller blades 319 are attached to the central hub 322 of the propeller 318 through a hinge 320 to permit the folding of the blades 319. In FIG. 3 the blades 319 are depicted as being in a folded configuration, suitable for walking. To transition to a flight configuration, as is illustrated in FIG. 6, the blades 319 are unfolded.

The blades 319 can be unfolded radially outwardly in a variety of manners, including, but not limited to centrifugal motion on propeller 318 startup or via an actuator 376. For example, a spring (not shown) inside the hub 322 can place a force upon the blades 319 toward a folded configuration. When the flying motor 314 begins to rotate the blades 319, the outward force generated by the blades 319 is sufficient to overcome the force generated by the spring and the blades 319 fold outwardly. Similarly, when the blades 319 cease rotation, the spring force causes the blades 319 to fold.

Alternatively, the use of actuator motor 376 are very small motors which can open and close each propeller 318 individually. Actuator 376 acts on the blades 319 of the propeller 318 through a hollow shaft 378 in a manner similar to how a traditional, variable pitch propeller works on an airplane. The actuator 376 sits behind the flying motor 341 and there is a hollow shaft 378 that goes to the propeller 318. Inside the hollow shaft 378 is a smaller control shaft (not shown) configured to generate linear and/or rotational movement to change the pitch of the propeller blades 319.

Figure 5:
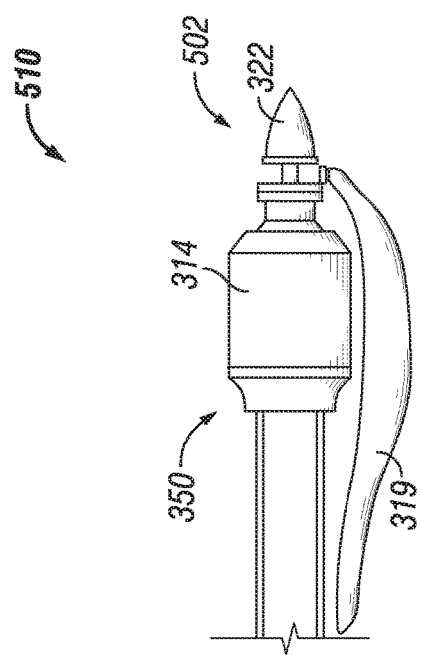
FIG. 5 is a schematic illustration of the motor and propeller of FIG. 3.
Figure 4:
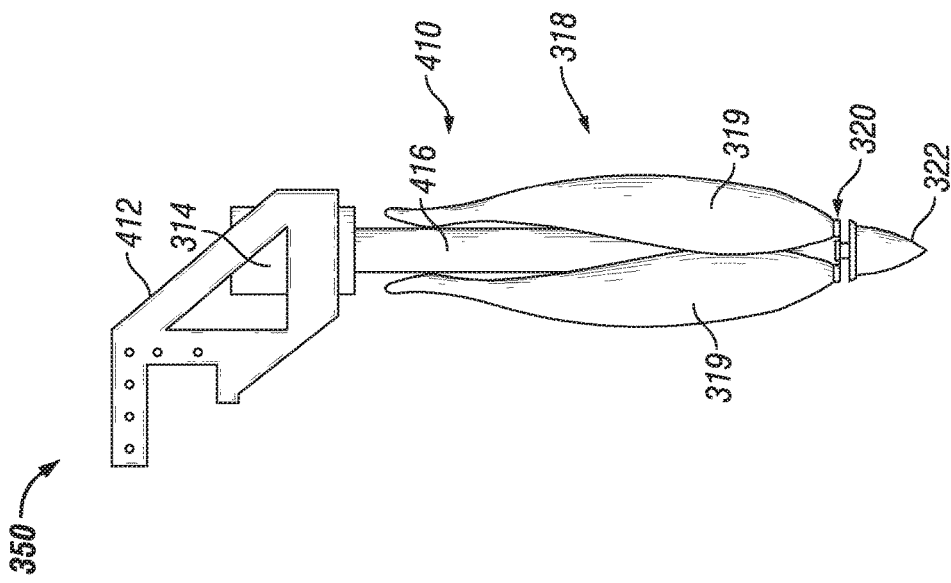
FIG. 4 is a schematic illustration of one form of a limb having a motor and propeller attached thereto.

FIGS. 4-5 depict alternative embodiments of a leg assembly 410, 510 which includes a propeller 318 located near a distal end of a limb 350. Referring now to FIG. 4, a leg assembly 410 fashioned in accordance with the principles of the present application is shown. The leg assembly 410 includes an upper frame 412 that supports a drive motor 314. A drive shaft 416 is connected to the drive motor 314 with a foot 322 at its distal end. The drive motor 314 is situated at the triangular joint 412 of the leg assembly 410. The foot 322 is shown as cone-shaped, but may take other forms as desired. The propeller 318 includes several propeller blades 319 and a central hub 322, serving as the foot 322. As was previously discussed, the blades 319 are connected to the drive shaft 416 via a spring hinge/hinge 320. The spring hinge/hinge 320 allows the blades 319 of the propeller 318 to fold up around the drive shaft 416 when not in use, as in a walking configuration. Rotation of the drive shaft 416 by the drive motor 314 causes the blades 319 to unfold. In this manner the propeller 318 may generate thrust to propel the drone in flight.

FIG. 5 depicts the leg assembly 510 of FIG. 3. The motor 314 itself acts as a weight bearing portion of the leg 350. In this form, the motor 314 is located near the distal end of the leg 350. Locating the motor 314 near the distal end of the leg 350 can result in a more traditional looking foot rather than having the propeller shaft 416 as a load bearing portion.

Although the motor 314 can take various forms, the motor 314 of FIG. 4 is depicted as an outrunner motor. Outrunner motors are typically low RPM and high torque. These motors are typically short and fat and do not require a gearbox. Alternatively, the motor 314 of FIGS. 3 and 5 is depicted as an inrunner, or standard, motor. Inrunner motors are typically high RPS low torque; therefore, they typically require a gearbox, which can be integrated in the motor assembly 502.

FIG. 6 depicts the drone 300 in a flying configuration 604. In this flying configuration, the propellers 318 face upward so that thrust 602 generated by the propellers will lift the drone 300 off the ground. To transition from the walking configuration depicted in FIG. 3 to the flying configuration 604, the walking motors 338, 336 act on the legs 350 to pivot the legs 350 at the joints 332 and 334. In this manner the central hub 322 of the propeller 318 is rotated approximately 180 degrees from the walking configuration, in which the central hub 322 acts as a contact surface 340 against the ground, to the flying configuration 604 in which the central hub 322 points substantially upward so that the propellers 318 can pull straight up. In the configuration depicted in FIGS. 3 and 6, as each leg includes a propeller 318 which transitions 180 degrees, a lower portion 608 of the central section 370 can serve as a landing gear on which the drone 300 will rest prior to takeoff. The blades 319 can then be unfolded, as was previously discussed, and the motors 314 rotate the propellers 318 such that flight may be achieved.

Figure 7:
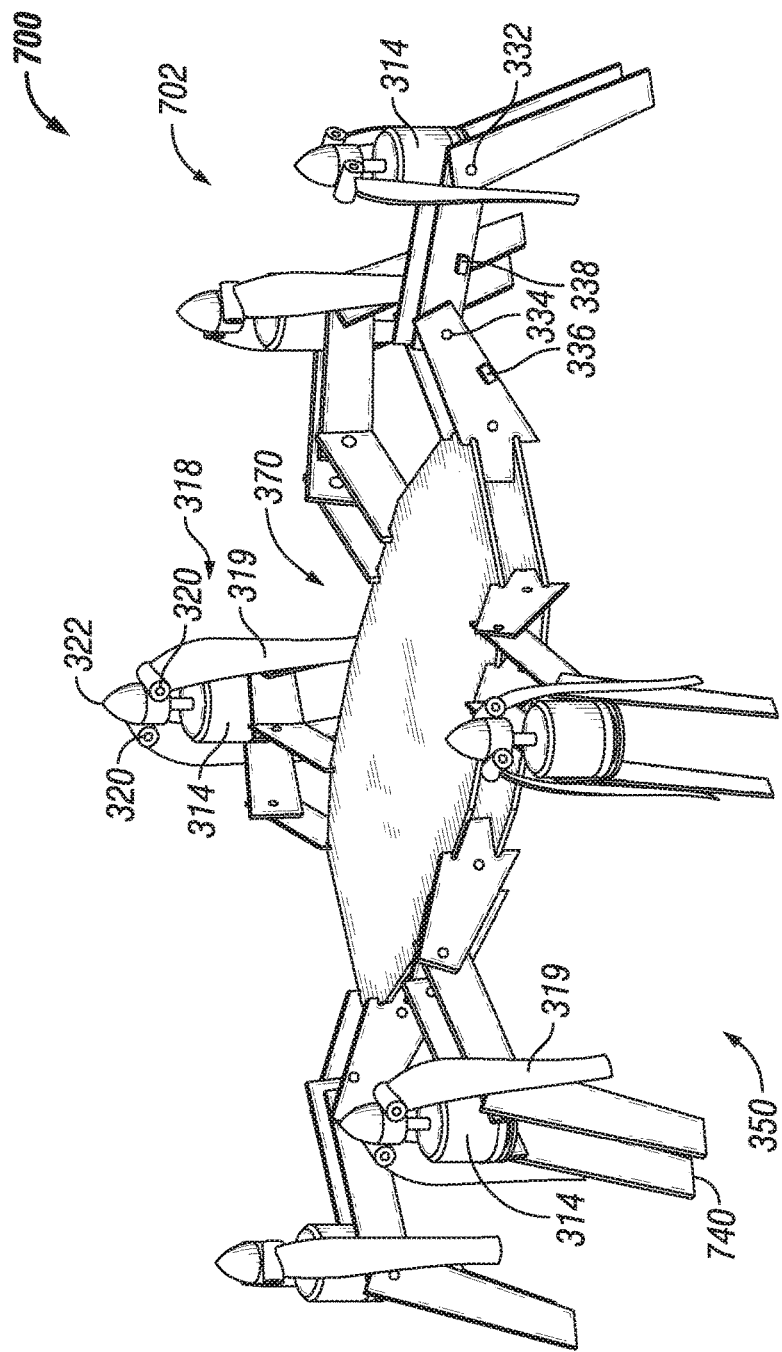
FIG. 7 is a perspective view of a walking and flying drone, depicted in a walking configuration, according to another form of the present application.

FIG. 7 depicts a walking and flying drone 700 according to another form of the present application. The motors 314 and propellers 318 of the drone 700 differ from drone 300 previously discussed. The motors 314 of the drone 700 are located along the leg 350 rather than at the distal end of the leg 350. As illustrated, the motors 314 of drone 700 are located substantially near the joint 332; however, it is additionally contemplated that the motors 314 can be located along the leg 350 at any location between the central section 370 and the joint 332. As the central hub 322 of the propeller 318 does not define the contact surface 740, the contact surface 740 can be configured in a variety of shapes and sizes. As would be readily understood to one of ordinary skill, as the contact surface 340 of FIG. 3 rotates, symmetry is desirable. Moreover, one or more of the limbs 350 can include both a motor 314 and propeller 318 as well as have a manipulator at a distal end of the limb 350. Manipulators allow the limb to grasp, e.g. to open doors, lift an object, or the like. Furthermore, this mounting location allows for the propellers 318 to face upward when the drone 700 is in a walking configuration 702. This can permit a faster transition between walking and flying.

Figure 8:
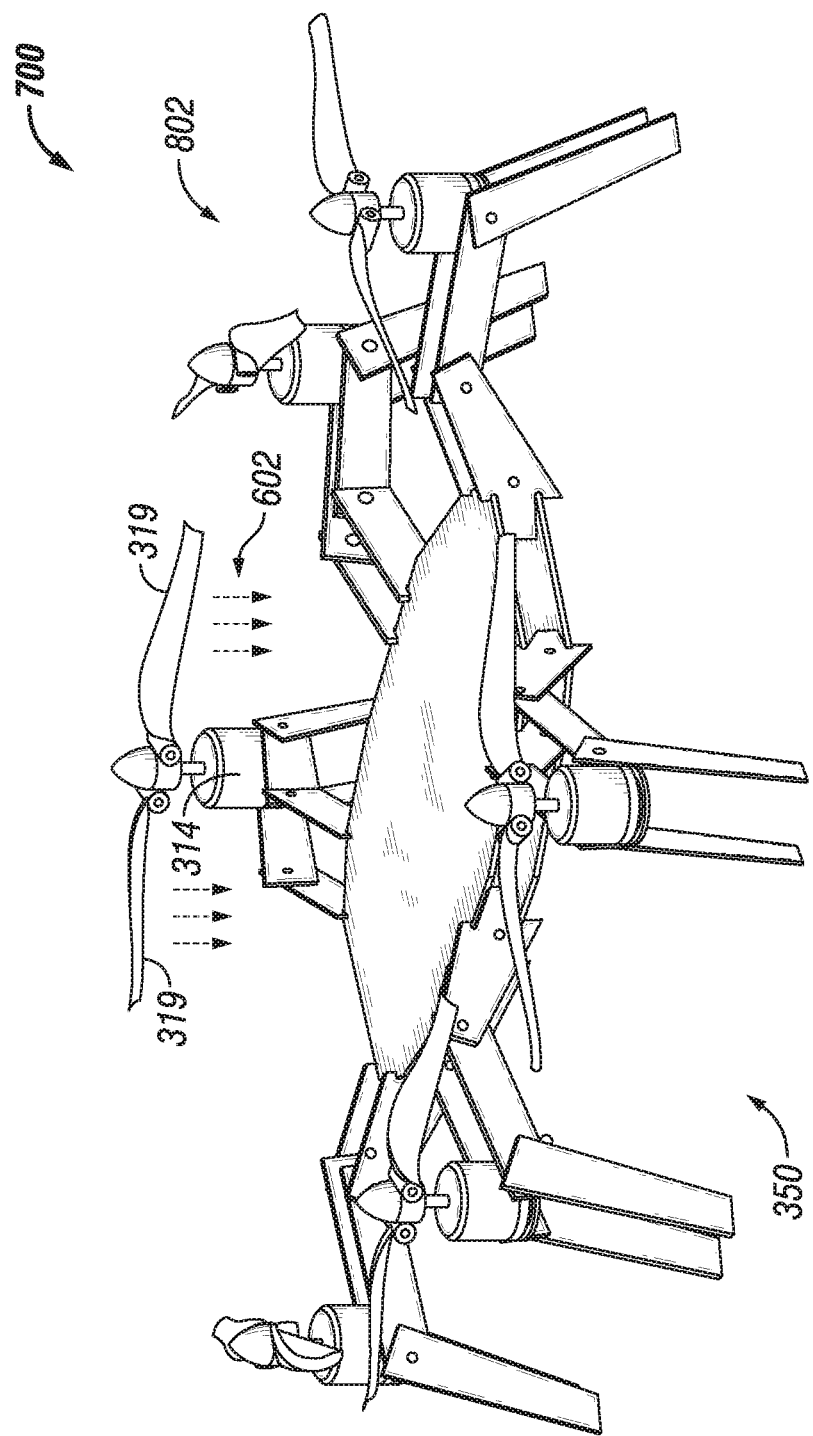
FIG. 8 depicts the walking and flying drone of FIG. 7 in a flying configuration.

Referring now to FIGS. 7 and 8, to transition between the walking configuration 702 and the flying configuration 802, the walking motors 336, 338 act on the legs 350 to position the central hubs 322 of the propellers 318 such that they face upwardly. The blades 319 are then folded outwardly. The motors 314 then rotate the propeller blades 319 such that thrust 602 is generated and the drone 700 can achieve flight.

Although the drones 300 and 700 have previously been depicted and described as a hexapod, it is envisioned that a variety of limbs and/or limb configurations can be utilized such that the drones 300, 700 can walk and fly. For example, less than all of the limbs 350 may have a motor 314 and a propeller 318 attached thereto such that only some of the limbs 350 are "flying limbs" and the remaining limbs 350 can be dedicated walking and/or manipulator limbs.

Some non-limiting, exemplary configurations of drones 300, 700 will be discussed hereinafter. In one form the drone 300 can include a tripod, having three legs 350, where each of the three legs 350 has a motor 314 and propeller 318 attached thereto. A further form is a hexapod drone having motors 314 and propellers 318 attached to four of the legs 350. Two of the limbs 350 of this hexapod drone can then have manipulators attached thereto so that the drone can open doors and do other tasks. Additionally, an octopod could be configured to have four motors 314 attached to four limbs 350, with four of the remaining limbs having manipulators attached thereto.

Moreover, it is contemplated that a drone could include some motor/propeller assemblies according to the teachings of FIG. 3 (i.e. disposed at a distal end of the leg) and some motor/propeller assemblies according to the teachings of FIG. 7. For example, a hexapod drone could have motors 314 and propellers 318 attached to a distal end of three legs 350 per the teachings of FIG. 3 and have motors 314 and propellers 318 attached near joint 332 per the teachings of FIG. 7.

Locating the motors 314 and propellers 318 on the articulating legs 350 permits the propellers 318 to be transitioned during flight through thrust vectoring. For example, the propeller 318 located on one leg 350 could act as an articulated tail for flight control. Additionally and/or alternatively, the drone could act in a "SPLIT" mode where multiple propellers 318 are retained in a vertical position, such as with a helicopter, and one or more propellers 318 are in a forward position like in a fixed wing aircraft. For example, in a hexapod where all six legs further include propellers 318, all six propellers could be vertically oriented to provide a quick takeoff. When takeoff is achieved, two forward propellers 318 could be transitioned to a forward facing position. However, it is contemplated that the propellers 318 can be angled by the articulating legs 350 in any manner desired during flight.

Uses

The present walking and flying drone can do inspections such as inspecting windmills. The drone can fly up to the top of the windmill to its upper platform. The drone can walk around the platform, open the access door and walk through the access door. One or more cameras can then permit a user to check all of the panels, etc.

If utilized for naval intelligence, the present drone can land on a ship and transition to a walking mode. In this walking mode the drone can then travel into the vessel and explore the passages within the vessel (e.g. to explore the cargo hold of the vessel). It is also contemplated that the drone could be utilized to locate a GPS tag on a vessel so that the vessel can be tracked.

The present drone can aid in inspection of power lines by flying up and having a leg catch onto the line and then walk on the line like to inspect every single inch of the power line at a very close range.

The present drone can also aid in search and rescue. The drone can fly over, e.g. a forest, to attempt to locate a person. Upon a possible sighting, the drone can then land, transition to a walking configuration, and attempt to confirm that the lost person was located.

For package delivery, to avoid dense vegetation in a yard, the drone could land in the street, walk up the sidewalk to the front door and drop off a package.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus capable of walking and flight, comprising:
   a central section supported by a plurality of limbs, wherein a contact surface is located near a distal end of each of the plurality of limbs;
   wherein the limbs are configured to generate a walking-type motion in which the contact surfaces cooperate with an environmental surface in a manner sufficient to propel the central section along the environmental surface; and
   a motor operably coupled to at least one limb of the plurality of limbs, wherein the motor is drivingly coupled to a propeller, wherein the propeller is located near a distal end of the limb, and wherein a central hub of the propeller defines the contact surface, and wherein the motor and propeller are configured to propel the central section in flight.

2. The apparatus of claim 1, further comprising a joint operably coupled to the limb, wherein the joint is configured to transition the propeller approximately 180 degrees between a walking configuration in which the central hub of the propeller points substantially downward to a flying configuration in which the central hub of the propeller points substantially upward.

3. The apparatus of claim 2, wherein the propeller further comprises a plurality of folding blades.

4. The apparatus of claim 1, wherein the joint is further configured to selectively vary a direction of the propeller in a manner sufficient to alter a direction of a thrust produced by the propeller.

5. The apparatus of claim 1, further comprising a joint operably coupled to the limb, wherein the motor is located on the limb at a location between the joint and the distal end of the limb, and wherein a central hub of the propeller is located above at least a portion of the limb in a walking configuration.

6. The apparatus of claim 5, wherein the propeller further comprises a plurality of folding blades.

7. The apparatus of claim 1, further comprising at least one manipulator limb, distinct from, the plurality of limbs, wherein the manipulator limb is configured to grasp an object.

8. A drone apparatus capable of walking and flying, comprising:
   at least three limbs extending outwardly from a central section;
   a joint operably coupled to each of the at least three limbs, wherein the joint is configured to permit at least a portion of each of the at least three limbs to pivot upon application of a motive force thereto, and wherein the at least three limbs are configured to propel the central section with a walking-type motion; and
   a motor operably coupled to at least one limb of the at least three limbs, wherein a propeller is operably coupled to and selectively driven by the motor, wherein the motor and propeller are configured to propel the central section in flight, and wherein the central section further comprises a battery configured to provide electricity to the motors and an antenna configured to receive a signal from a remote control device.

9. The drone of claim 8, wherein the propeller includes a plurality of blades configured to fold inward toward the limb in a walking configuration.

10. The drone of claim 9, wherein the propeller is located near a distal end of the limb, and wherein a central hub of the propeller defines a contact surface configured to contact an environmental surface during the walking-type motion.

11. The drone of claim 10, wherein the limb is configured to transition the propeller approximately 180 degrees between a walking configuration in which the, central hub of the propeller points substantially downward to a flying configuration in which the central hub of the propeller points substantially upward.

12. The drone of claim 8, wherein the motor is located on the limb near the joint, and wherein a central hub of the propeller is suspended above and outwardly from the limb.

13. The drone of claim 8, further comprising a motor operably coupled to each limb of the at least three limbs, wherein a propeller is operably coupled to and selectively driven by the motor, and wherein the motor and propeller are configured to propel the central section in flight.

14. The drone of claim 8, further comprising a manipulator limb distinct from the at least three limbs, wherein at least a portion of the manipulator limb is configured to grasp.

15. A drone apparatus capable of walking and flying, comprising:
   a plurality of limbs extending outwardly from a central section, arid wherein the plurality of limbs include a pivotal joint configured to permit at least a portion of the plurality of limbs to pivot upon application of a motive, force thereto in a manner sufficient to propel the central section in a walking-type motion;
   a motor operably coupled to at least one limb of the plurality of limbs, wherein a propeller is operably coupled to and selectively driven by the motor, wherein the propeller is located near a distal end of the at least one limb, and wherein the motor and propeller are configured to propel the central section in flight; and
   wherein the at least one limb is configured to transition the propeller from a downwardly facing "walking configuration" to an upwardly facing "flying configuration".

16. The drone of claim 15, wherein a central hub of the propeller defines a contact surface configured to contact an environmental surface during the walking-type motion.

* * * * *